United States Patent
Kilibarda

(10) Patent No.: US 9,802,664 B2
(45) Date of Patent: Oct. 31, 2017

(54) HIGH DENSITY WELDING

(71) Applicant: COMAU, Inc., Southfield, MI (US)

(72) Inventor: Velibor Kilibarda, West Bloomfield, MI (US)

(73) Assignee: Comau LLC, Southfield, MI (US)

( * ) Notice: Subject to any disclaimer, the term of this patent is extended or adjusted under 35 U.S.C. 154(b) by 533 days.

(21) Appl. No.: 14/245,459

(22) Filed: Apr. 4, 2014

(65) Prior Publication Data

US 2014/0217155 A1 Aug. 7, 2014

Related U.S. Application Data

(62) Division of application No. 12/269,955, filed on Nov. 13, 2008, now Pat. No. 8,713,780.

(Continued)

(51) Int. Cl.
*B62D 65/00* (2006.01)
*B62D 65/02* (2006.01)
(Continued)

(52) U.S. Cl.
CPC .......... *B62D 65/022* (2013.01); *B23K 37/047* (2013.01); *B62D 65/02* (2013.01);
(Continued)

(58) Field of Classification Search
CPC ...... B62D 65/022; B62D 65/02; B65G 35/00; B23K 37/047; B23K 2201/006;
(Continued)

(56) References Cited

U.S. PATENT DOCUMENTS 3,854,889 A 12/1974 Lemelson
4,232,370 A 11/1980 Tapley
(Continued)

FOREIGN PATENT DOCUMENTS

DE 19806963 A1 10/1998
EP 0261297 A1 3/1988
(Continued)

OTHER PUBLICATIONS

FMC; Automated Fork lifts and Material Handling Lifts—Forked Automated Guided Vehicles; http://www.fmcsgvs.com/content/products/forked.sub.-vehicles.htm;p. 1.
(Continued)

*Primary Examiner* — Richard Chang
(74) *Attorney, Agent, or Firm* — Young Basile Hanlon & MacFarlane, P.C.

(57) ABSTRACT

Methods for welding motor vehicle body component subassemblies at a weld stations are disclosed. First and second pallets may be arranged for reciprocal movement between a load/unload station and the weld station and the pallets are alternately moved from a load/unload station to the weld station while the other pallet is moved from the weld station to a load/unload station. Each pallet may have a plurality of substations for receipt of component subassemblies and, while each pallet is at the load/unload station, the component subassembly at each substation is moved to the next successive substation and a further component is added to the moved component.

12 Claims, 11 Drawing Sheets

Related U.S. Application Data

(60) Provisional application No. 61/052,764, filed on May 13, 2008.

(51) Int. Cl.
  *B23K 37/047* (2006.01)
  *B65G 35/00* (2006.01)
  *B23K 101/00* (2006.01)

(52) U.S. Cl.
  CPC ........ *B65G 35/00* (2013.01); *B23K 2201/006* (2013.01); *B23P 2700/50* (2013.01); *Y10T 29/49622* (2015.01); *Y10T 29/49826* (2015.01); *Y10T 29/49828* (2015.01); *Y10T 29/49829* (2015.01); *Y10T 29/534* (2015.01)

(58) Field of Classification Search
  CPC ......... Y10T 29/49622; Y10T 29/49828; Y10T 29/534; Y10T 29/49829; Y10T 29/49826; B23P 2700/50
  See application file for complete search history.

(56) References Cited

U.S. PATENT DOCUMENTS

| | | | |
|---|---|---|---|
| 4,328,422 A | 5/1982 | Loomer | |
| 4,369,563 A | 1/1983 | Williamson | |
| 4,442,335 A | 4/1984 | Rossi | |
| 4,530,056 A | 7/1985 | MacKinnon et al. | |
| 4,600,136 A | 7/1986 | Sciaky et al. | |
| 4,659,895 A | 4/1987 | Di Rosa | |
| 4,667,866 A | 5/1987 | Tobita et al. | |
| 4,679,297 A | 7/1987 | Hansen, Jr. et al. | |
| 4,734,979 A | 4/1988 | Sakamoto et al. | |
| 4,736,515 A | 4/1988 | Catena | |
| 4,738,387 A | 4/1988 | Jaufmann et al. | |
| 4,779,787 A | 10/1988 | Naruse et al. | |
| 4,795,075 A | 1/1989 | Pigott et al. | |
| 4,800,249 A | 1/1989 | Di Rosa | |
| 4,815,190 A | 3/1989 | Haba, Jr. et al. | |
| 5,011,068 A | 4/1991 | Stoutenburg et al. | |
| 5,239,739 A * | 8/1993 | Akeel | B23K 37/047 29/430 |
| 5,301,411 A * | 4/1994 | Fujiwara | B23P 19/04 29/430 |
| 5,319,840 A * | 6/1994 | Yamamoto | B62D 65/02 29/430 |
| 5,347,700 A | 9/1994 | Tominaga et al. | |
| 5,397,047 A | 3/1995 | Zampini | |
| 5,427,300 A | 6/1995 | Quaglne | |
| 5,560,535 A | 10/1996 | Miller et al. | |
| 5,577,595 A | 11/1996 | Pollock et al. | |
| 5,902,496 A | 5/1999 | Alborante | |
| 5,940,961 A | 8/1999 | Parete | |
| 5,943,768 A | 8/1999 | Ray | |
| 6,059,169 A | 5/2000 | Nihei et al. | |
| 6,065,200 A | 5/2000 | Negre | |
| 6,098,268 A | 8/2000 | Negre et al. | |
| 6,138,889 A | 10/2000 | Campani et al. | |
| 6,170,732 B1 | 1/2001 | Vogt et al. | |
| 6,193,142 B1 * | 2/2001 | Segawa | B23K 37/047 219/127 |
| 6,250,533 B1 | 6/2001 | Otterbein et al. | |
| 6,324,880 B1 | 12/2001 | Nakamura | |
| 6,336,582 B1 | 1/2002 | Kato et al. | |
| 6,457,231 B1 | 10/2002 | Carter et al. | |
| 6,467,675 B1 | 10/2002 | Ozaku et al. | |
| 6,516,234 B2 | 2/2003 | Kamiguchi et al. | |
| 6,564,440 B2 | 5/2003 | Oldford et al. | |
| 6,627,016 B2 * | 9/2003 | Abare | B29C 65/78 156/64 |
| 6,744,436 B1 | 6/2004 | Chirieleison, Jr. et al. | |
| 6,799,673 B2 | 10/2004 | Kilabarda | |
| 6,948,227 B2 | 9/2005 | Kilibarda et al. | |
| 7,076,865 B2 * | 7/2006 | Morbitzer | B23P 19/001 29/33 P |
| 7,331,439 B2 | 2/2008 | Degain et al. | |
| 7,546,942 B2 | 6/2009 | Monti et al. | |
| 7,946,030 B2 * | 5/2011 | Tanaka | B23P 21/004 29/33 P |
| 8,308,048 B2 | 11/2012 | Kilibarda | |
| 8,713,780 B2 | 5/2014 | Kilibarda | |
| 2003/0037432 A1 | 2/2003 | McNamara | |
| 2003/0057256 A1 | 3/2003 | Nakamura et al. | |
| 2003/0115746 A1 | 6/2003 | Saito et al. | |
| 2003/0188952 A1 | 10/2003 | Oldford et al. | |
| 2003/0189085 A1 | 10/2003 | Kilibarda et al. | |
| 2004/0020974 A1 | 2/2004 | Becker et al. | |
| 2004/0216983 A1 | 11/2004 | Oldford et al. | |
| 2004/0221438 A1 | 11/2004 | Savoy et al. | |
| 2005/0008469 A1 | 1/2005 | Jung | |
| 2005/0035175 A1 | 2/2005 | Nakamura et al. | |
| 2005/0120536 A1 | 6/2005 | Kilibarda et al. | |
| 2005/0189399 A1 | 9/2005 | Kilibarda | |
| 2005/0230374 A1 | 10/2005 | Rapp et al. | |
| 2005/0236461 A1 | 10/2005 | Kilibarda et al. | |
| 2005/0269382 A1 | 12/2005 | Caputo et al. | |
| 2006/0157533 A1 | 7/2006 | Onoue et al. | |
| 2007/0164009 A1 | 7/2007 | Hesse | |
| 2008/0061110 A1 | 3/2008 | Monti et al. | |
| 2008/0084013 A1 | 4/2008 | Kilibarda | |
| 2008/0105733 A1 | 5/2008 | Monti et al. | |
| 2008/0116247 A1 | 5/2008 | Kilibarda | |
| 2008/0131255 A1 | 6/2008 | Hessler et al. | |
| 2008/0295335 A1 | 12/2008 | Kilibarda et al. | |
| 2009/0078741 A1 | 3/2009 | Sata et al. | |
| 2009/0285666 A1 | 11/2009 | Kilibarda | |
| 2010/0301099 A1 | 12/2010 | Sata et al. | |

FOREIGN PATENT DOCUMENTS

| | | |
|---|---|---|
| EP | 0446518 A1 | 9/1991 |
| EP | 1403176 A2 | 3/2004 |
| GB | 2250723 A | 6/1992 |
| WO | 8603153 A1 | 6/1986 |
| WO | 2006109246 A1 | 10/2006 |

OTHER PUBLICATIONS

FMC; SGV (Self Guided Vehicles)—Automated Guided Vehicle Systems; http://www.fmcsgvs.com/content/products/sgv.htm, p. 1.

FMC; Automated Material Handling Systems & Equipment for Material Movement: AGV Applications; http://www.fmcsgvs.com/content/sales/applications.htm; pp. 1-2.

FMC; Layout Wizard AGV Configuration Software; http://fmcsgvs.com/content/products/wizard.htm; p. 1.

FMC; AGV System Controls; http://www.fmcsgvs.com/content/products/system.htm; p. 1.

FMC; Laser Navigation Controls; http://www.fmcsgvs.com/content/products/nav.htm; pp. 1-2.

European Search Report dated Apr. 19, 2011 from the corresponding European Patent Application No. 11152656.2-2302.

European Search Report dated Aug. 28, 2009 from the corresponding European Patent Application No. 09158794.9-2302.

* cited by examiner

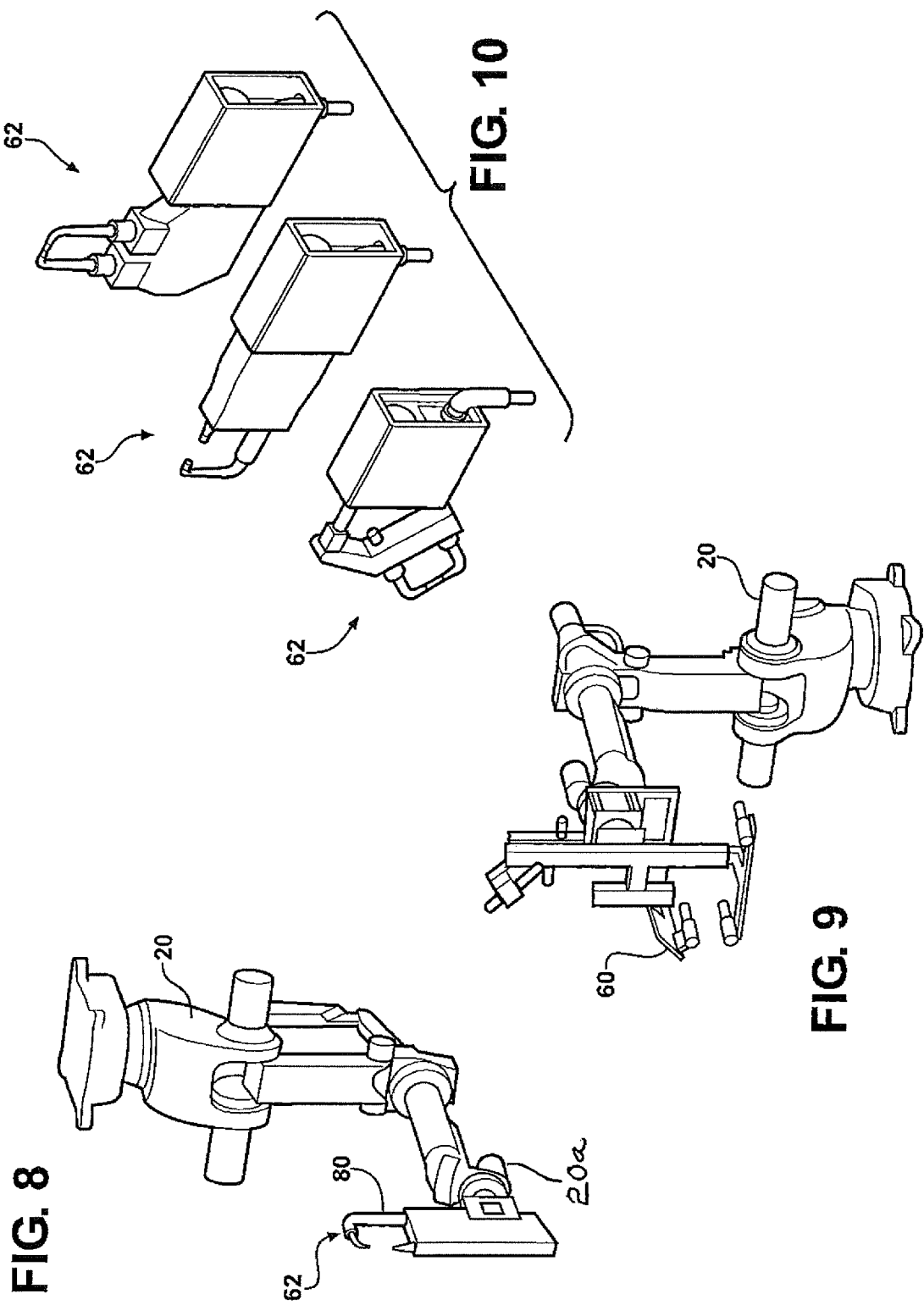

HIGH DENSITY WELDING

CROSS-REFERENCE TO RELATED APPLICATION

The present divisional application claims the benefit of U.S. Provisional Application Ser. No. 61/052,764 filed May 13, 2008 and U.S. patent application Ser. No. 12/269,955 filed Nov. 13, 2008, both of which are incorporated herein by reference in their entirety.

BACKGROUND OF THE DISCLOSURE

This invention relates to motor vehicle manufacturing and more particularly to a high density welding processes to facilitate manufacture of subassembly components of motor vehicle bodies.

In the mass production of motor vehicles on an assembly line basis, it is imperative that the various subassembly components come together for the final assembly process in an efficient and orderly manner. The current subassembly procedures, while generally satisfactory, tend to be manpower-intensive, tend to require large amounts of factory floor space, sometimes present maintenance complications, require excessive capital expenditures, and may present safety and/or environmental concerns.

SUMMARY OF THE DISCLOSURE

The present invention is directed to the provision of an improved high density welding subassembly machine for motor vehicle applications.

More specifically, the present invention is directed to a high density welding subassembly machine requiring minimal factory floor space, requiring minimal operational manpower, requiring a relatively low initial capital investment, providing easy maintenance, and minimizing safety and environmental concerns.

The invention provides a method of welding motor vehicle components at a weld station. The method comprises providing a pallet having a plurality of successive substations for receipt of component subassemblies; reciprocally moving the pallet back and forth between a load/unload station and the weld station; while the pallet is at the load/unload station, moving the component subassembly at each substation to the next successive substation and adding a further component to each moved component subassembly; and while the pallet is at the weld station, welding each component subassembly at each substation of the pallet.

According to a further feature of the invention methodology, the weld station substations includes a plurality of substations corresponding to the plurality of substations; as the pallet arrives at the welding station, the pallet substations are aligned respectively with the weld station substations; and a welding operation is performed at each welding station substation unique to the component subassembly positioned on the pallet at the weld station substation.

According to a further feature of the invention methodology, the steps of moving the pallet back and forth between the weld station and the load/unload station, welding each component subassembly at each substation of the pallet while the pallet is at the weld station, and moving each welded component subassembly to the next successive weld station of the pallet and adding a further component to the moved subassembly while the pallet is at the load/unload station, are repeated until a final welded subassembly is presented at the final substation with the pallet positioned at the load/unload station, whereafter the final welded subassembly is removed from the pallet for use in further motor vehicle assembly processes.

According to a further feature of the invention methodology, the pallet has at least first, second, and third substations and wherein, as the pallet is positioned at the load/unload station, a subassembly consisting of components A/B/C/D is removed from the third substation; a subassembly consisting of components A/B/C is moved from the second substation to the third substation; a new component D is added to the subassembly A/B/C positioned at the third substation; a subassembly consisting of components A/B is moved from the first substation to the second substation; a new component C is added to the subassembly A/B positioned at the second substation; and new components A and B are loaded onto the first substation.

According to a further feature of the invention methodology, the pallet comprises a first pallet and the method further comprises providing a second pallet reciprocally movable between a load/unload station and the weld station and having a plurality of successive substations for receipt of component subassemblies; alternately moving each pallet from its load/unload station to the weld station while moving the other pallet from the weld station to its load/unload station; and while each pallet is at the load/unload station, moving the component subassembly at each substation to the next succeeding substation and adding a further component to the moved subassembly.

According to a further feature of the invention methodology, each pallet has its own load/unload station and the load/unload stations and the weld station are in linear alignment with the weld station positioned between the load/unload stations.

The invention further provides an apparatus for welding motor vehicle components at a weld station. The apparatus of the invention comprises a weld station; a load/unload station; a pallet mounted for reciprocal movement between the load/unload station and the weld station and having a plurality of successive pallet substations thereon for receipt of component subassemblies; and a transfer system proximate the load/unload station operative with the pallet positioned at the load/unload station to move the component subassembly at each substation to the next successive substation and add a further component to each moved subassembly so that the component subassembly at a particular pallet substation includes one more component than the subassembly at the immediately preceding substation and one less component than the component subassembly at the immediately succeeding substation.

According to a further feature of the invention apparatus, the transfer system includes robotic devices positioned at the load/unload station.

According to a further feature of the invention apparatus, the apparatus further includes a storage structure positioned proximate the load/unload station and storing inventories of components for use in forming the component subassemblies.

According to a further feature of the invention apparatus, the apparatus further includes a conveyor positioned between the storage structure and the load/unload station and including a run positioned proximate the storage structure for receipt of components from inventory and a run proximate the load/unload station for delivery of components to the load/unload station for loading onto the pallet substations by the transfer system.

According to a further feature of the invention apparatus, the pallet includes an initial substation, a final substation, and intermediate substations; the transfer system is operative to move component subassemblies successively from the initial substation to the final substation; and the transfer system is further operative to remove a final welded component subassembly from the final substation for use in further motor vehicle assembly processes.

According to a further feature of the invention apparatus, the load/unload station comprises a first load/unload station, the pallet comprises a first pallet, and the transfer system comprises a first transfer system; and the apparatus further includes a second load/unload station, a second pallet mounted for reciprocal movement between the second load/unload station and the weld station and having a plurality of successive substations, and a second transfer system operative with the second pallet positioned at the second load/unload station to move the component subassemblies at each substation to the next successive substation and add a further component to each moved subassembly.

According to a further feature of the invention apparatus, the apparatus further includes tooling at each pallet substation configured to receive and accurately position the components of the specific component subassembly at that substation.

According to a further feature of the invention apparatus, while one pallet is at its load/unload station for movement of the subassemblies between the successive substations, the other pallet is at the weld station for welding of the component subassemblies at the substations.

BRIEF SUMMARY OF THE DRAWINGS

The description herein makes reference to the accompanying drawings wherein like reference numerals refer to like parts throughout the several views and wherein:

FIGS. 8, 9 and 10 are detail views showing subassembly enablers.

DETAILED DESCRIPTION

Figure 1:
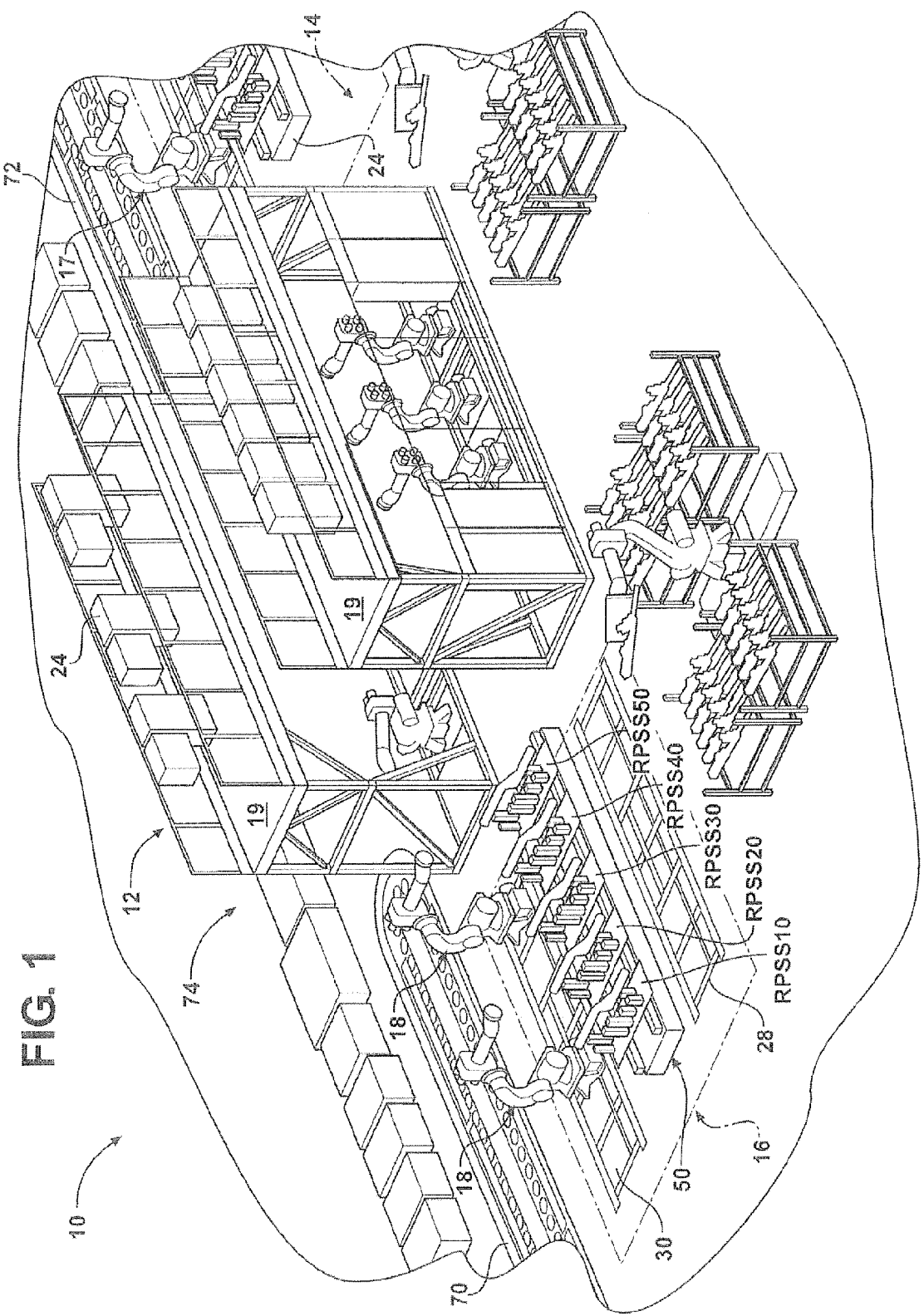
FIG. 1 is a perspective view of the subassembly machine of the invention.

The high density welding subassembly 10 of the invention, broadly considered, includes a weld station 12, a left load/unload station 14, a right load/unload station 16, a left transfer system 17, and a right transfer system 18.

Welding station 12 includes a pair of longitudinally extending, of laterally spaced scaffold structures 19 defining a weld area WA therebetween and a plurality of robots 20 supported on the scaffold structure. For example, each scaffold structure may support welding robots positioned on and extending upwardly from the base 21 of the scaffold structure in longitudinally spaced relation and three inverted welding robots extending downwardly from the top wall 22 of the scaffold structure in longitudinally spaced relation. Each scaffold structure 19 further includes leg support structures 23 extending downwardly from the top wall 22 to define an open working space WS below the top wall and the inverted robots 20 carried by the top wall 22 extend downwardly into the working space WS. The lower operative ends 20*a* of the inverted robots extend into the weld area WA between the laterally spaced scaffold structures for coactions in performing welding or other operations on motor vehicle components positioned in the weld area. The weld station comprises a plurality of successive substations and may, for example, include five substations including a weld station substation 10 (WSS10), WSS20, WSS30, WSS40 and WSS50, each including one or more welding robots and one or more positioning robots. Each scaffold structure further includes suitable control panels 24 positioned on the top walls 22 proximate the outboard faces of the scaffold structures. The number, spacing and functioning of robots at each substation will, of course, vary depending upon the particular application.

Left load/unload station 14 includes a pallet 24 mounted on a base pallet structure 26 for reciprocal powered movement on tracks or rollers between load/unload station 14 and weld station 12 and including a plurality of successive pallet substations corresponding to the weld station substation and including a left pallet substation 10 (LPSS10), LPSS20, LPSS30, LPSS40 and LPSS50. Unique component tooling LAB, LABC, LABCD, LABCDE, and LABCDEF is positioned at the five left pallet substations, respectively.

Left transfer system 17 includes robot base support structures 28/30 on opposite sides of the pallet base structure, spaced load robots 32/34 slidably positioned on robot base structure 28, unload robot 36 slidably positioned on robot base structure 30, and unload robot 38 mounted on robot slide base structure 40 for selective sliding movement toward and away from the pallet structure.

Right load/unload station 16 is similar to station 14 and includes a pallet 50 mounted on a pallet base structure 52 for reciprocal powered movement on tracks or rollers between load/unload station 16 and weld station 12 and including a plurality of successive pallets substations corresponding to the weld station substations and to the left pallet substations and including a right pallet substation 10 (RPSS10), RPSS20, RPSS30, RPSS40, and RPSS50. Unique tooling RAB, RABC, RABCD, RABCDE, and RABCDEF (corresponding respectively to tooling LAB, LABC, LABCD, LABCDE, and LABCDEF) is positioned at the five right pallet substations respectively.

Right transfer system 18 includes robot base structures 54/56 on opposite sides of the pallet base structure, a pair of longitudinally spaced load robots 58, 60 slidably mounted on the robot base structure 54 and an unload robot 64 mounted on a slide 66 for sliding movement toward and away from the pallet base structure.

Subassembly machine 10 further includes an endless conveyor 70 positioned proximate robot base 28 of left transfer system 17, a further endless conveyor 72 positioned proximate robot base 54 of right transfer system 18, a component inventory storage structure in the form of a row of dunnage containers or racks 74 positioned in outboard relation to conveyors 70, 72, and a plurality of dunnage racks 76 positioned on opposite sides of each slide 40/66.

Endless conveyor 70 includes a run 70*a* positioned proximate and parallel to inventory containers 74 and a run 70*b* positioned proximate and parallel to robot base 28. Endless conveyor 72 includes a run 72*a* positioned proximate and parallel to inventory containers 74 and a run 72*b* positioned proximate and parallel to robot base 54.

Operation

Figure 2:
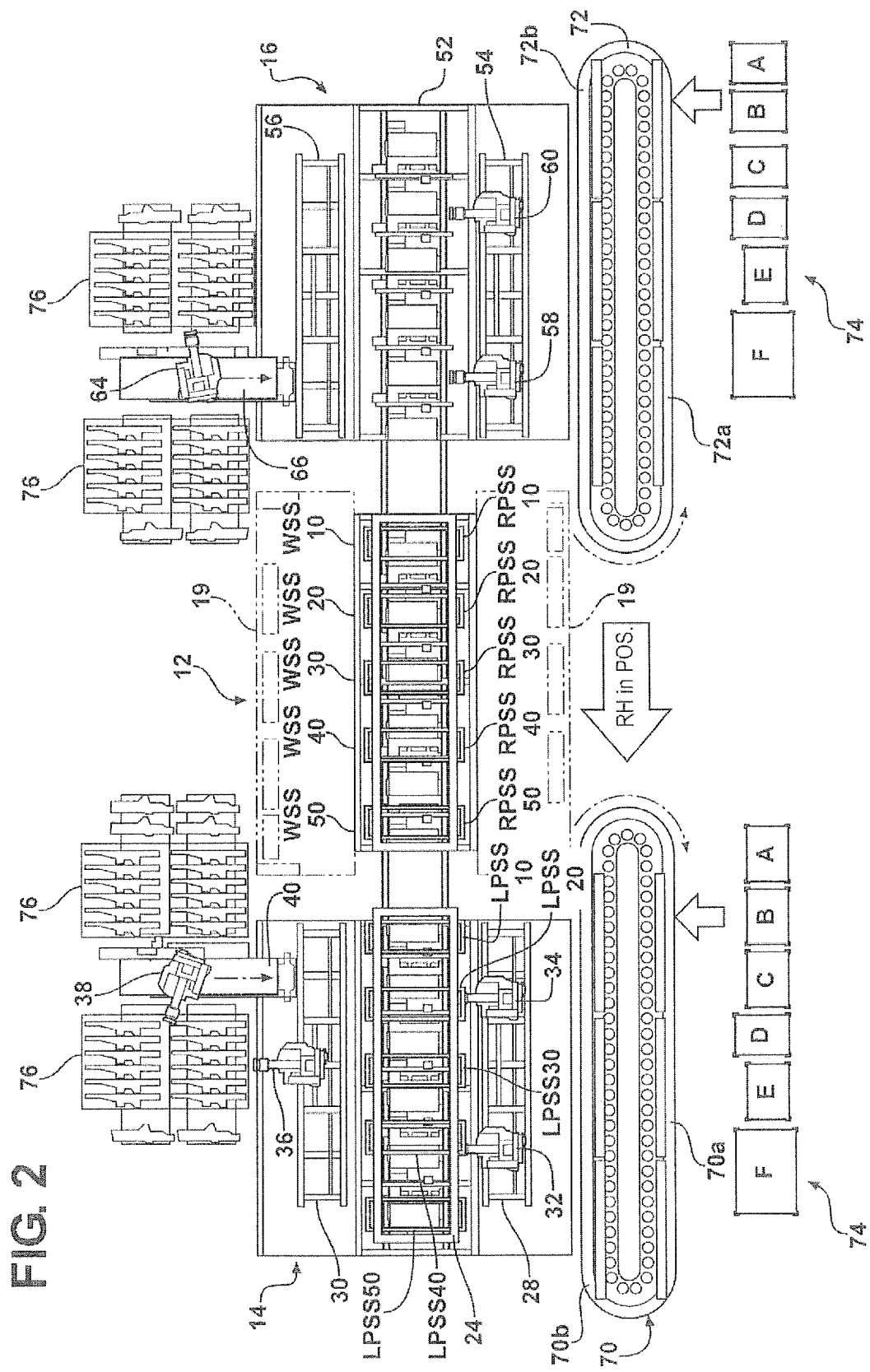
FIGS. 2, 3 and 4 are somewhat schematic views showing steps in the invention methodology.
Figure 3:
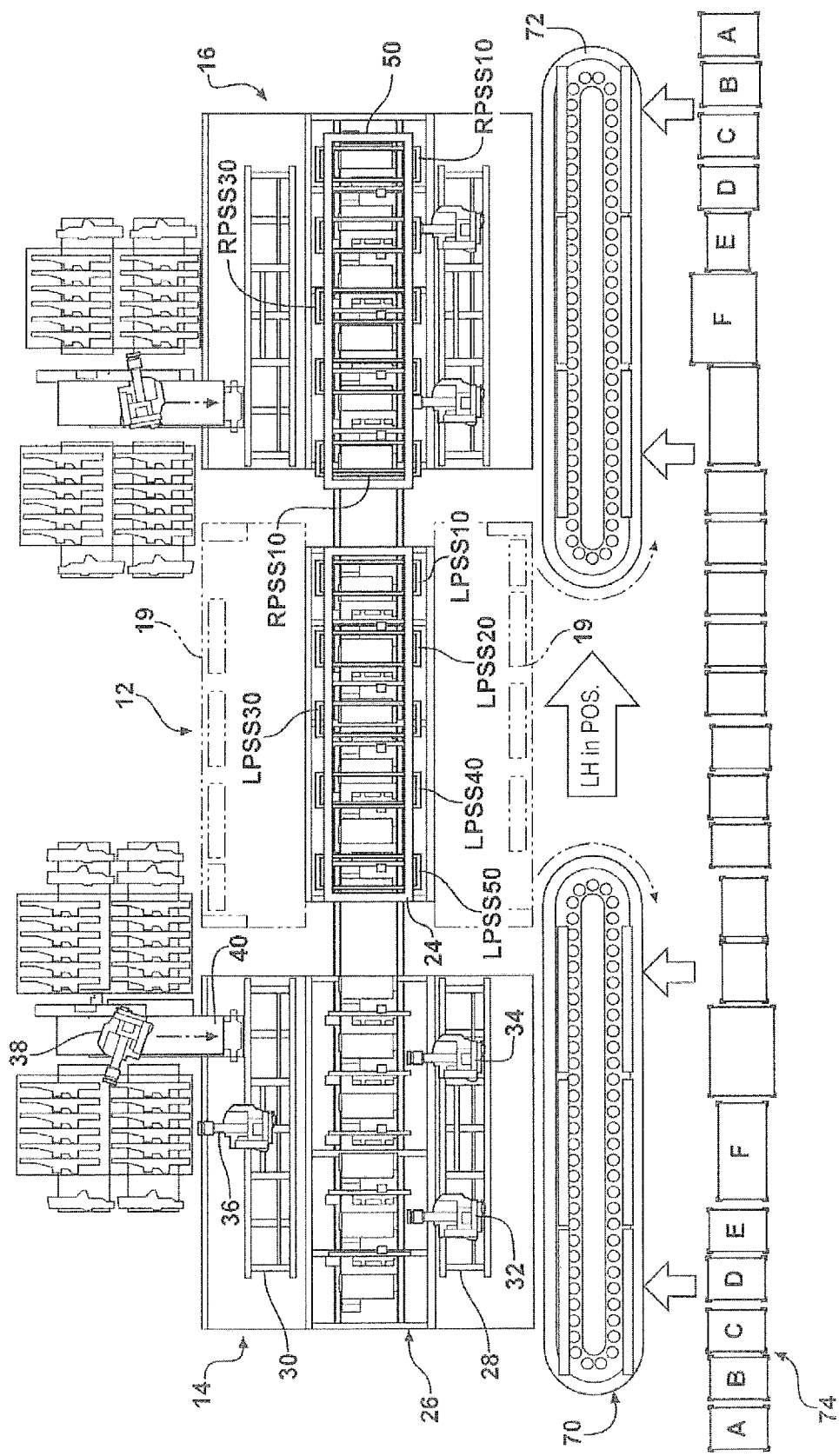
Figure 4:
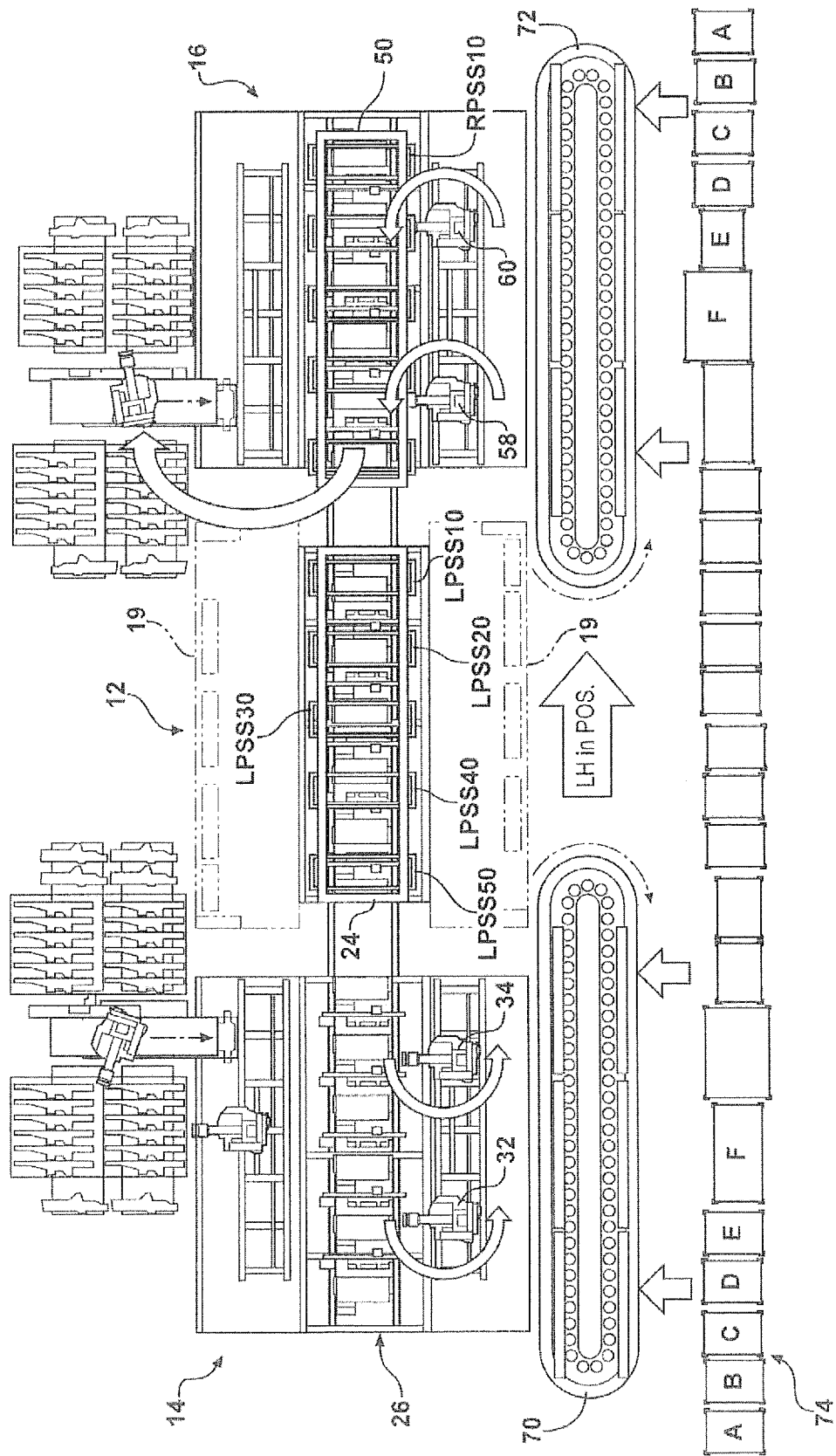
Figure 5:
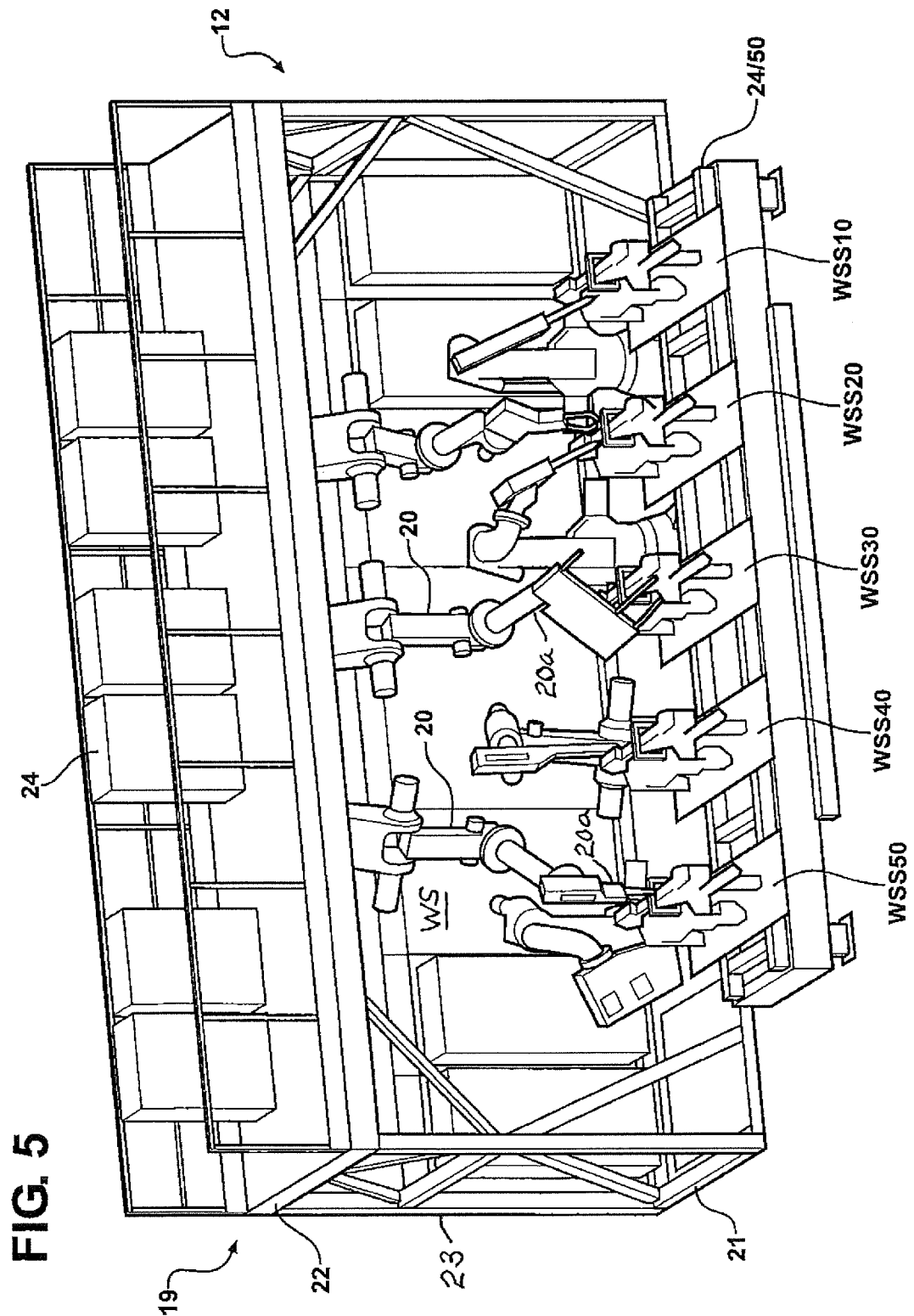
FIG. 5 is a perspective view of a weld station forming a part of the invention welding machine.
Figure 6:
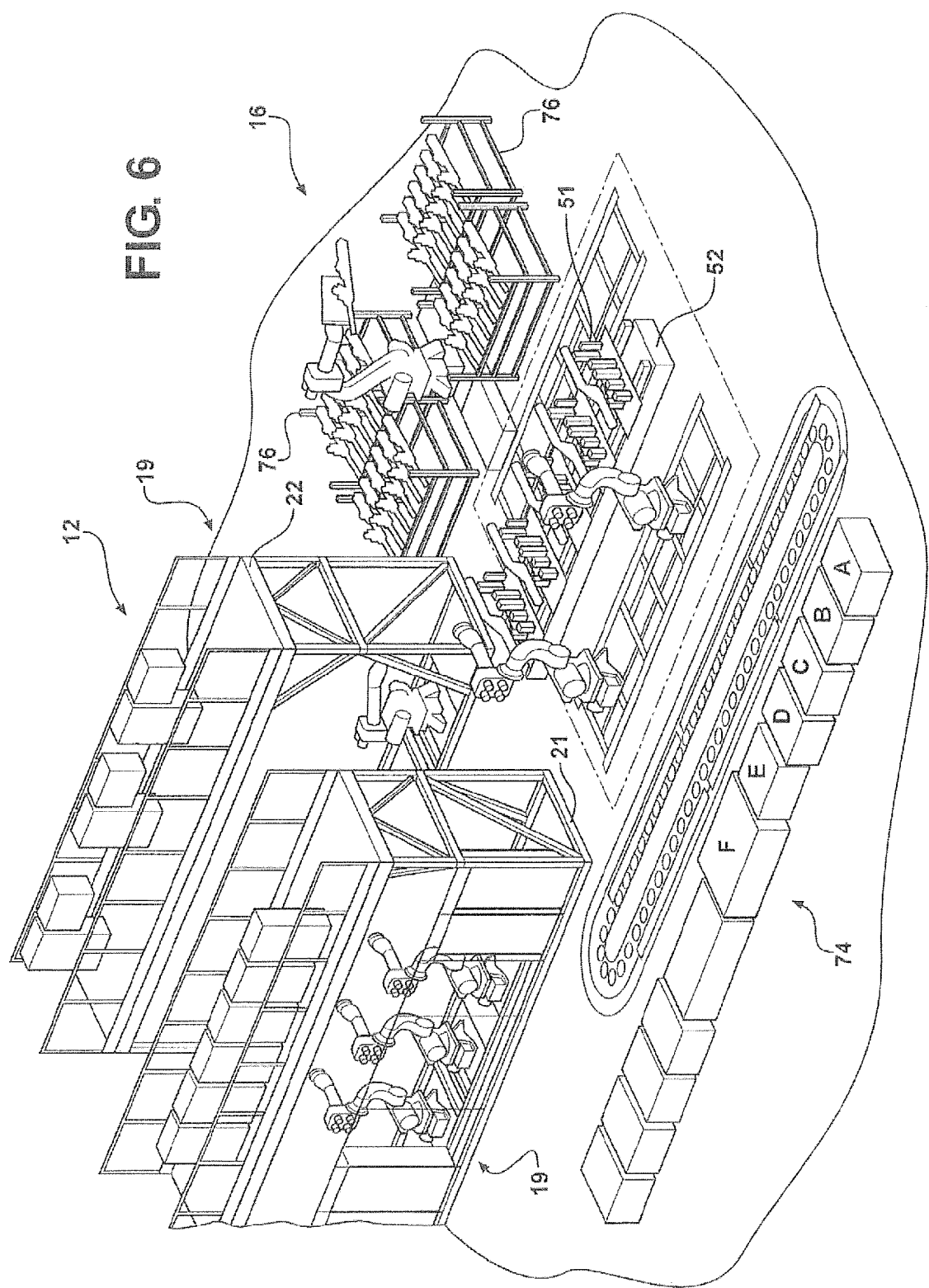
FIG. 6 is a further perspective view of the invention welding machine.
Figure 7:
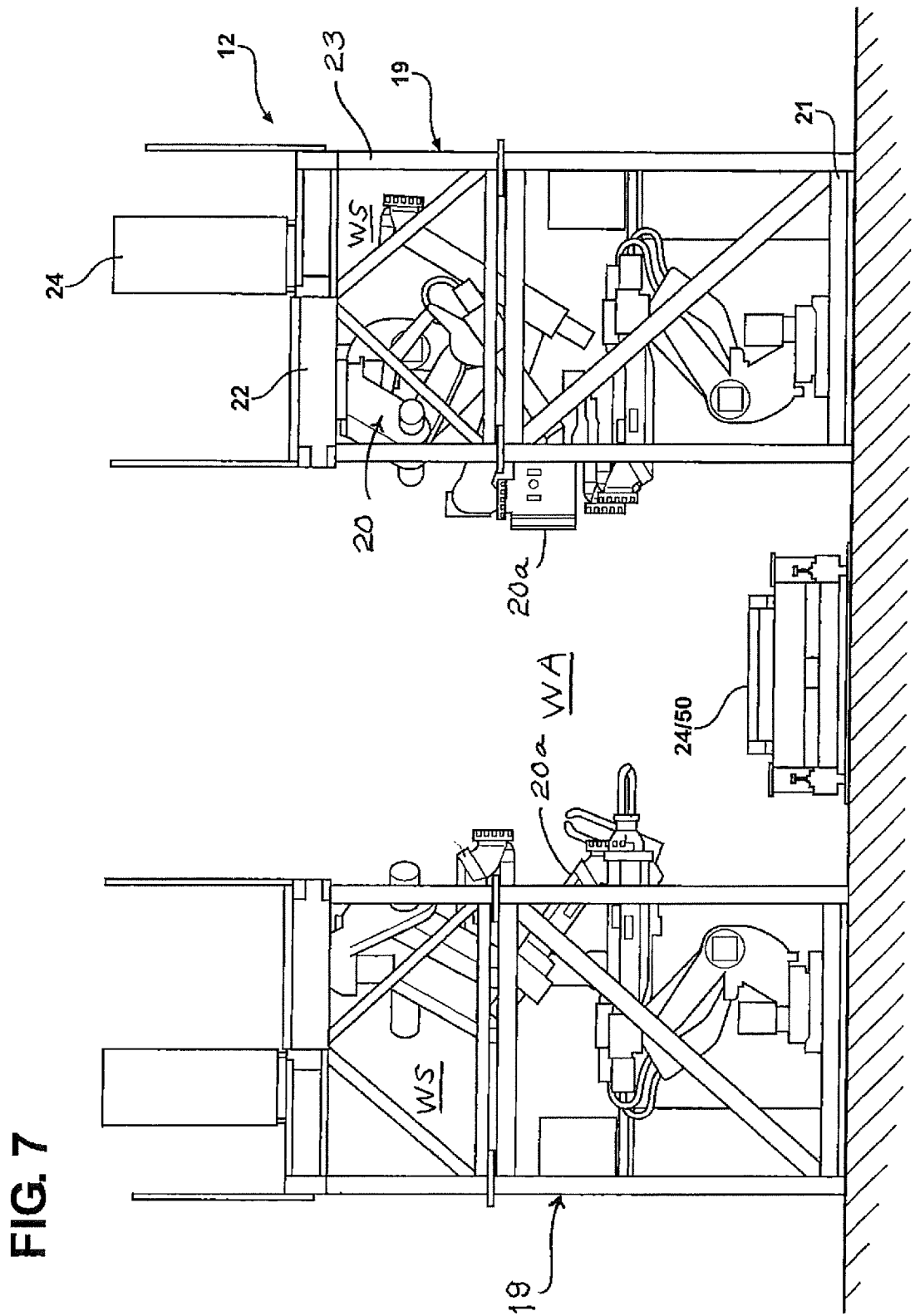
FIG. 7 is an elevational view of the weld station.

In overview, while components on pallet 24 from station 14 are positioned in the weld station for suitable welding operations (FIG. 3), component subassemblies on pallet 50 in the load/unload station 16 are being unloaded and loaded, whereafter, following completion of the welding operations on the components subassemblies positioned on the pallet 24, that pallet is shuttled back to the load/unload station 14 for suitable unloading and loading (FIG. 2) while the component subassemblies on pallet 50 are shuttled to the weld station for suitable welding operations and this sequence is continued until the job in question is completed. To facilitate the shuttling movement of the pallets, the longitudinal center lines of stations 12, 14, 16 are aligned so that the shuttling movement of the pallets is linear straight line and direct.

More specifically, at start-up of a particular job, pallets 24/50 are empty. Initially, and with particular reference to FIGS. 11, 12, 13 and 14, two body sheet metal components A/B are loaded onto substation RPSS10 of pallet 50 utilizing load robots 58/60 receiving parts from conveyor 72, whereafter the pallet is shuttled to the weld station for welding of components A/B at weld station substation WSS10. While this welding operation is occurring, components A/B are loaded onto LPSS10 of pallet 24 utilizing load robots 32/34 retrieving parts from conveyor run 70b. When the welding operation is complete, pallet 50 is shuttled back to station 14 and pallet 24 is moved to the weld station for welding of components A/B at WSS10. As this welding is taking place, welded components A/B are moved to RPSS20, a third component C is added to components A/B at RPSS20 and new components A/B are loaded onto RPSS10, whereafter following completion of the welding, pallet 24 is shuttled back to station 14 and pallet 50 is shuttled to the weld station for welding of components A/B/C at WSS20 and welding of components A/B at WSS10. While this welding is taking place, welded components A/B at LPSS10 of pallet 24 are moved to LPSS20, a third component C is added to components A/B at LPSS20, and new components A/B are loaded onto LPSS10 whereafter, following completion of the welding, pallet 50 is shuttled back to station 16 and pallet 24 is shuttled to the weld station for welding of components A/B/C at WSS20 and welding of components A/B at WSS10. As this welding is taking place, welded components A/B/C at RPSS20 of pallet 50 are moved to RPSS30, a fourth component D is added to welded components A/B/C at RPSS30, welded components A/B at RPSS10 are moved to RPSS20, a third component C is added to welded components A/B at RPSS20, and new components A/B are loaded onto RPSS10.

Figure 11:
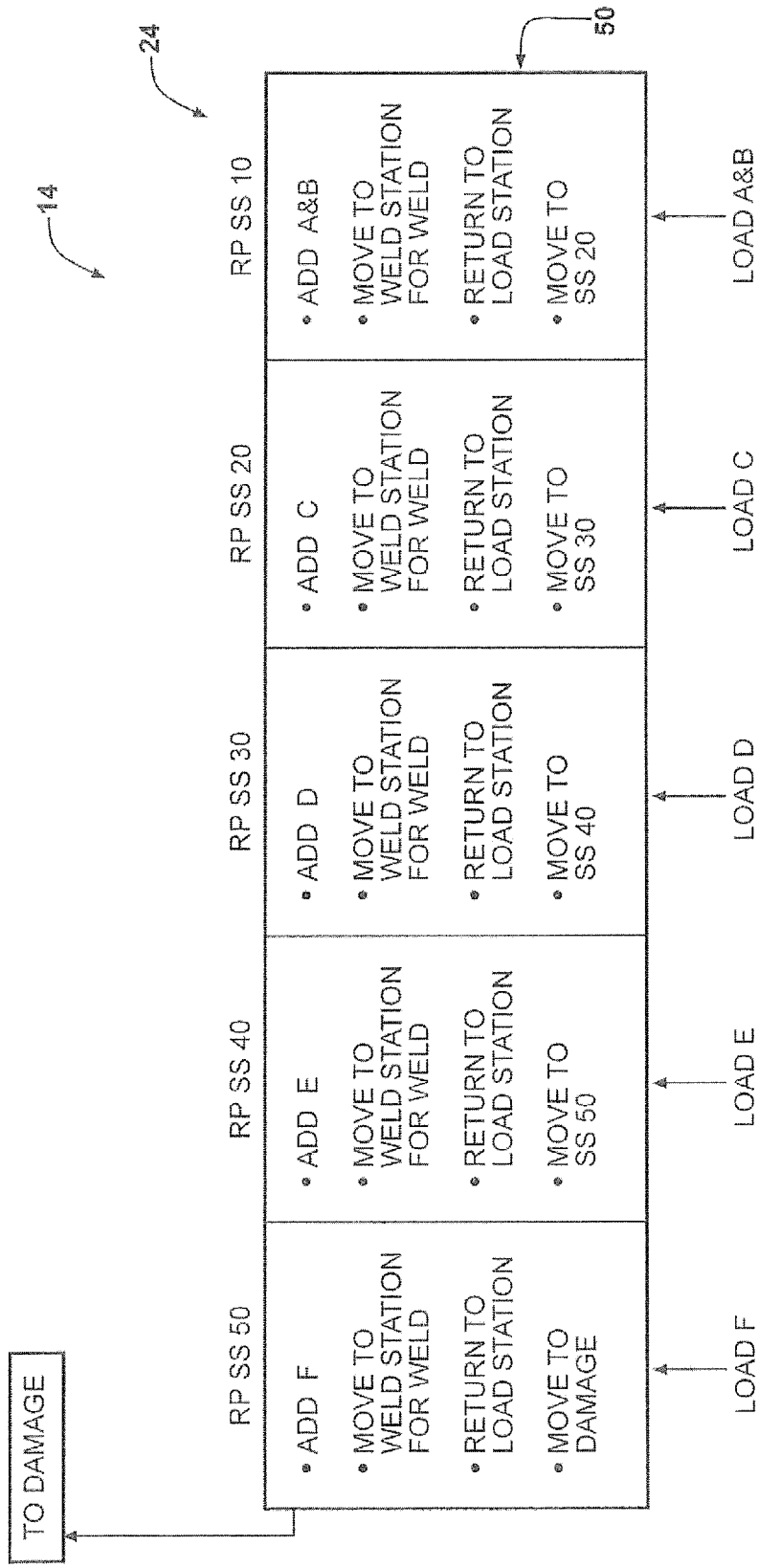
FIGS. 11, 12, 13 and 14 are diagrammatic views illustrating the invention methodology.
Figure 12:
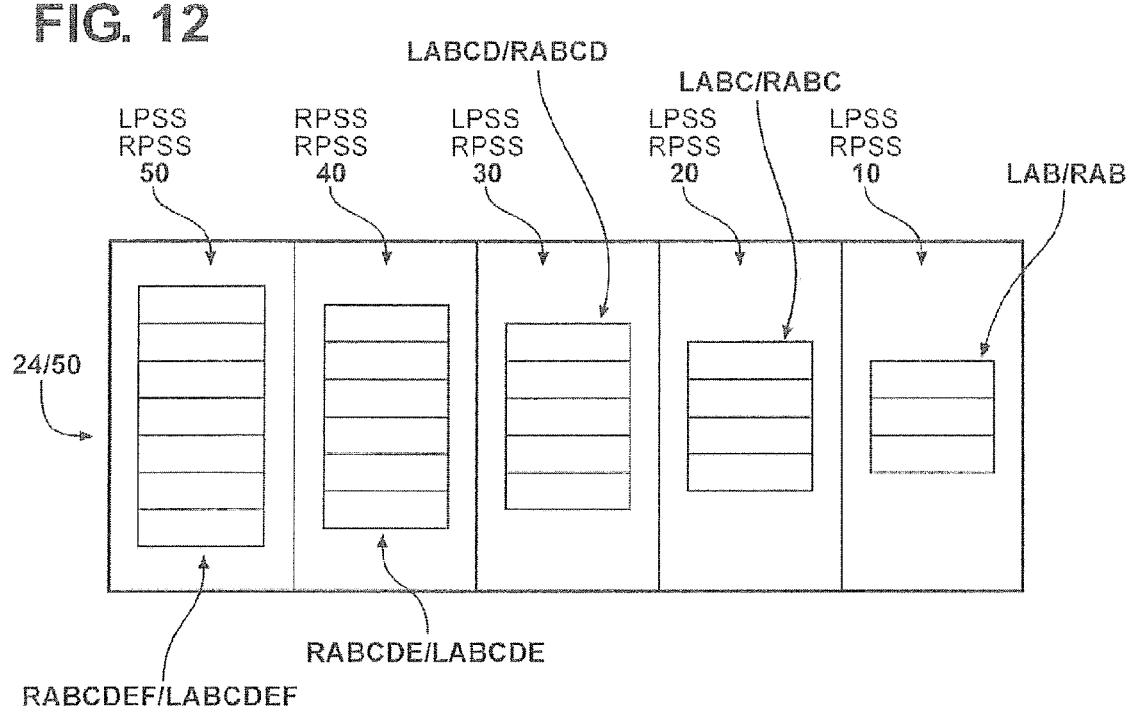
Figure 13:
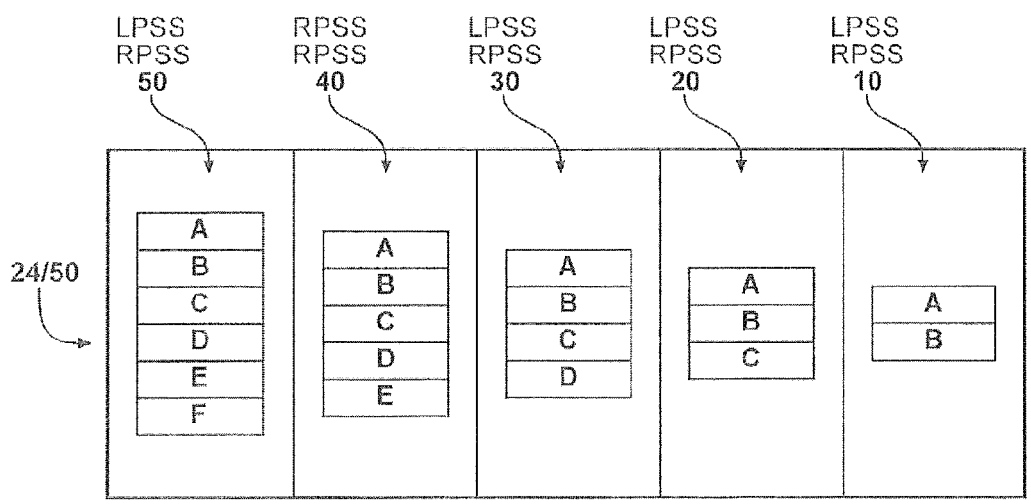
Figure 14:
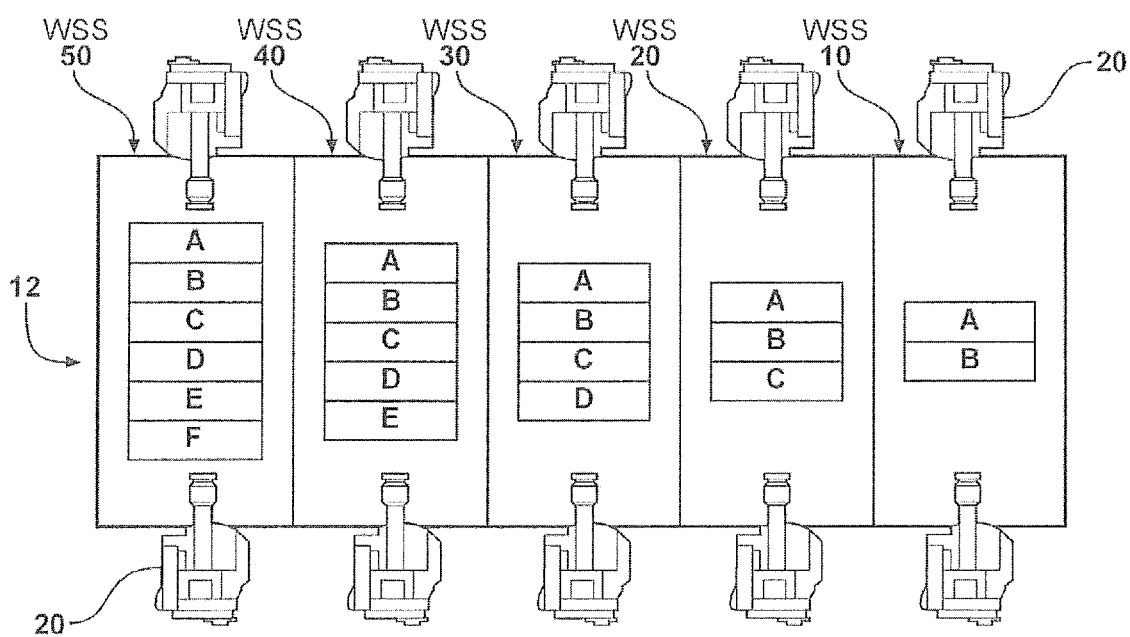

This shuttling and loading sequence is continued until welded components A/B are positioned at substation 10 of each pallet, welded components A/B/C are positioned at each substation 20 of each pallet, welded components A/B/C/D are positioned at substation 30 of each pallet, welded components A/B/C/D/E are positioned at substation 40 of each pallet, and welded components A/B/C/D/E/F are positioned at substation 50 of each pallet. Once each of the substations of each of the pallets is full, the sequence is as seen in FIG. 11 where, with respect to pallet 50, and with a fully loaded pallet 24 positioned in the weld station for welding of respective components A/B, A/B/C, A/B/C/D, A/B/C/D/E, and A/B/C/D/E/F, welded component subassembly A/B/C/D/E/F from RPSS50 is removed by robot 64 for placement in dunnage 74, welded component subassembly A/B/C/D/E at RPSS40 is moved to RPSS50 for addition of a component F, welded component subassembly A/B/C/D at RPSS30 is moved to RPSS40 for addition of a component E, welded component subassembly A/B/C at RPSS20 is moved to RPSS30 for addition of a component D, welded component subassembly A/B at substation 10 is moved to RPSS20 for addition of a component C, new components A/B are placed at RPSS10, and pallet 50 is shuttled back to a weld station for welding operations on the various component combinations as pallet 24 with fully welded components shuttles back to load/unload station 14.

It will be understood that, in each case, inventories of the appropriate components A, B, C, D, E, F are provided in appropriate racks or bins in row 74 and are loaded onto conveyor runs 70a/70b for retrieval from conveyor runs 70b/72b by the load robots, and the movement of the components between substations and the addition of components at the substations is performed utilizing load robots 58/60 at station 16 and load robots 32/34 at station 14. Unloading of welded component subassemblies ABCDEF from LPSS50 is performed at station 14 utilizing unload robots 36/38 with robot 36 retrieving the welded component subassembly ABCDEF from LPSS50, moving slidably along track 30 to track 40, and transferring the subassembly to robot 38 for delivery to dunnage 76. Unloading of welded component subassembly ABCDEF from RPSS50 is performed at station 16 utilizing unload robot 64 for delivery to dunnage 76.

It will be understood that the positioning of the various components at the various substations of the pallets is performed using dedicated tooling with tooling LAB/RAB designed to accommodate components A and B positioned at each pallet substation 10; tooling LABC/RABC designed to accommodate components A, B and C positioned at each pallet substation 20; tooling LABCD/RABCD designed to accommodate components A, B, C and D positioned at each pallet substation 30; tooling LABCDE/RABCDE designed to accommodate components A, B, C, D and E positioned at each pallet substation 40; and tooling LABCDEF/RABCDEF designed to accommodate components A, B, C, D, E and F positioned at each pallet substation 50.

It will further be understood that the robots 20 associated with each weld station substation may include positioning robots carrying positioning tooling such as the tooling 60 seen in FIG. 9, as well as welding robots carrying weld guns 62 as seen in FIGS. 8 and 10, and that robots carrying both positioning tooling and weld guns may also be employed.

Typical applications of the invention machine include the formation of body side inner right-hand and left-hand, front floor subassembly, center floor assembly, dash subassembly, cowl top and cowl side subassembly, rear wheel subassembly, rear pan subassembly, rear door left-hand and right-hand subassembly, front door left-hand and right-hand subassembly, lift gate and deck lid assembly, hood assembly, and closure hemming with respect to doors, hoods, decks and lift gates.

The invention high density welding machine has many advantages, chief of which is the ability to significantly reduce the required floor space for a particular job function. Further, the invention machine requires a minimum of manpower and a minimum of initial capital expenditure, and facilitates tooling maintenance and changeover since the tooling of the pallet not at the weld station is readily accessible for maintenance and changeover.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of welding motor vehicle components at a weld station comprising:

providing a pallet having a plurality of successive substations for receipt of component subassemblies;
reciprocally moving the pallet back and forth between a load/unload station and the weld station;
while the pallet is at the load/unload station, moving the component subassembly at each substation to the next successive substation and adding a further component to each moved component subassembly; and
while the pallet is at the weld station, welding each component subassembly at each substation of the pallet.

2. The method of claim 1, wherein:
the weld station includes a plurality of substations corresponding to the plurality of pallet substations;
as the pallet arrives at the weld station, the pallet substations align respectively with the weld station substations; and
a welding operation is performed at each weld substation unique to the component subassembly positioned on the pallet at that weld substation.

3. The method of claim 1, wherein the pallet comprises a first pallet and wherein the method further comprises:
providing a second pallet reciprocally movable between a load/unload station and the weld station and having a plurality of successive substations for receipt of component subassemblies;
alternately moving each pallet from its load/unload station to the weld station while moving the other pallet from the weld station to its load/unload station; and
while each pallet is at the load/unload station, moving the component subassembly at each substation to the next succeeding substation and adding a further component to each moved subassembly.

4. The method of claim 3, wherein:
each pallet has its own load/unload station; and
the load/unload stations and the weld station are in linear alignment with the weld station positioned between the load/unload stations.

5. The method of claim 4, wherein while one pallet is at its load/unload station for movement of the subassemblies between the successive substations, the other pallet is at the substation for welding of the component subassemblies at the substations.

6. A method of welding motor vehicle components at a weld station comprising:
providing first and second pallets reciprocally movable between a load/unload station and the weld station and each having a plurality of successive substations for receipt of component subassemblies;
alternately moving each pallet from its load/unload station to the weld station while moving the other pallet from the weld station to its load/unload station; and
while each pallet is at its load/unload station, moving the subassembly of components at each substation to the next successive substation and adding a further component to each moved subassembly.

7. The method of claim 6, wherein:
each pallet has its own load/unload station; and
the load/unload stations and the weld station are in linear alignment with the weld station positioned between the load/unload stations.

8. The method of claim 6, wherein while one pallet is at its load/unload station for movement of the subassemblies between the successive substations, the other pallet is at the weld station for welding of the component subassemblies at the substations.

9. A method of welding motor vehicle components at a weld station comprising:
providing a pallet having a plurality of successive substations for receipt of component subassemblies;
reciprocally moving the pallet back and forth between a load/unload station and the weld station;
while the pallet is at the load/unload station, moving the component subassembly at each substation to the next successive substation and adding a further component to each moved component subassembly;
while the pallet is at the weld station, welding each component subassembly at each substation of the pallet; and
repeating until a final welded subassembly is presented at the final substation with the pallet positioned at the load/unload station, whereafter the final welded subassembly is removed from the pallet for use in further motor vehicle assembly processes.

10. A method of welding motor vehicle components at a weld station comprising:
providing a pallet having a plurality of successive first, second and third substations for receipt of component subassemblies;
reciprocally moving the pallet back and forth between a load/unload station and the weld station;
while the pallet is at the load/unload station:
a subassembly consisting of components A/B/C/D is removed from the third substation;
a subassembly consisting of components A/B/C is moved from the second substation to the third substation;
a new component D is added to the subassembly A/B/C positioned at the third substation;
a subassembly consisting of components A/B is moved from the first substation to the second substation;
a new component C is added to the subassembly A/B positioned at the second substation; and
new components A and B are loaded onto the first substation; and
while the pallet is at the weld station, welding each component subassembly at each substation of the pallet.

11. The method of claim 9 wherein while the pallet is at the load/unload station, the method further comprising the steps of:
moving a welded subassembly AB from a first pallet substation to a second pallet substation;
loading a component C from an inventory to the welded subassembly AB at the second pallet substation; and
loading components A and B from the inventory onto the first pallet substation.

12. The method of claim 11 wherein while the pallet is at the load/unload station, the method further comprising the steps of:
moving a welded subassembly ABC from the second pallet substation to a third pallet substation; and
loading a component D from the inventory to the welded subassembly ABC at the third pallet substation.

* * * * *